March 21, 1939. E. J. MORGAN 2,150,936
AQUEOUS HEAT TRANSFER LIQUID
Filed Aug. 6, 1936
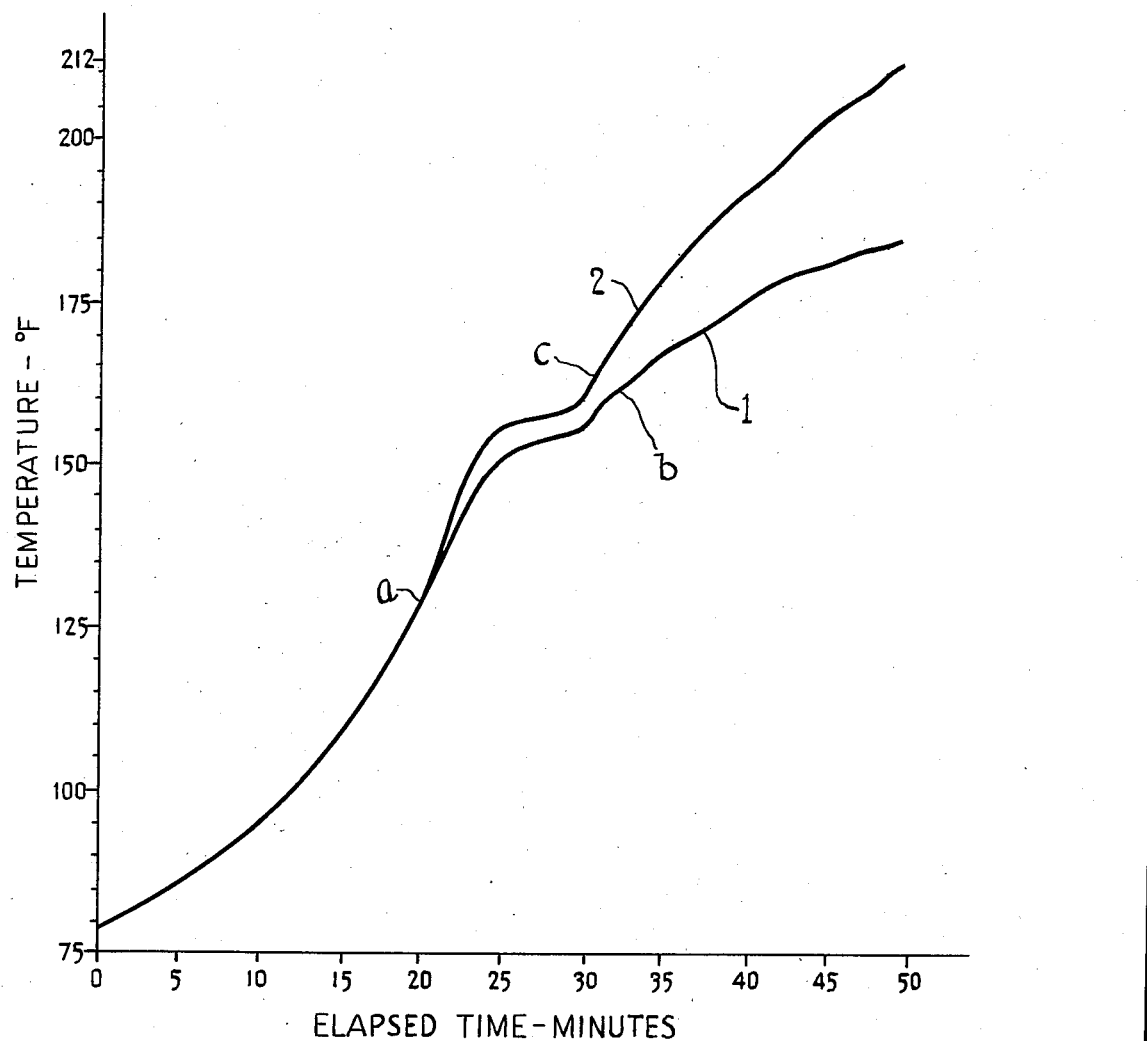
INVENTOR
EZRA J. MORGAN
BY
Hammond & Littell
ATTORNEYS Patented Mar. 21, 1939

2,150,936

UNITED STATES PATENT OFFICE 2,150,936

AQUEOUS HEAT TRANSFER LIQUID

Ezra J. Morgan, Chicago, Ill., assignor, by mesne assignments, to Meritor Chemical Company, Chicago, Ill., a corporation of Illinois Application August 6, 1936, Serial No. 94,556

12 Claims. (Cl. 252—5)

This invention relates to the improvement of heat transfer liquids having water as the basic constituent and to improved heat transfer liquids for use in carrying heat from a source of generation and liberating it at another point. The invention is useful, for example, for the improvement of radiator liquids in home heating systems and cooling fluids for internal combustion engines, and it provides improved liquids which are of particular importance for use in automobiles because of their anti-freeze qualities.

The universal heat exchange medium, despite many efforts to produce improved compositions, is water. Water is universally used not because it is an ideal liquid for heat transfer purposes under all conditions but because it is efficient at normal temperatures, is generally available, and its boiling point is such that it gives warning of excessive temperatures.

Nevertheless, water possesses many serious disadvantages. Although its heat capacity is relatively high, its conductivity is insufficient to enable the full capacity of a flowing stream to be utilized in circulatory systems requiring the transfer of large amounts of heat. At temperatures in the neighborhood of 160° F. water begins to vaporize materially, and such vaporization causes the formation of gas pockets which insulate the liquid from the heat-transmitting surface, thus impairing the efficiency of heat transfer. Furthermore, water is highly corrosive to metals forming the walls of cooling and heating systems, and this results both in rapid deterioration of such walls and progressively decreasing efficiency of heat transfer due to the insulating layers of corroded and deposited materials.

For low temperature operations, because of its relatively high freezing point, water is decidedly unsatisfactory. Water-alcohol and water-glycerine mixtures are commonly used to avoid freezing. Alcohol, however, is highly volatile, and it is difficult to maintain a satisfactory solution in the cooling systems of internal combustion engines and the like. Glycerine must be used in large percentages to impart satisfactory resistance to freezing, yet it tends to escape through minute orifices with resulting uncertainty of composition and expense. Mixtures of water with alcohol or glycerine are fully as corrosive to metals as water alone, and more corrosive to non-metallic parts.

It has been proposed to substitute oils for water as heat transfer liquids, especially for internal combustion engines, but major disadvantages accompany such substitutions. The heavier oils are difficult to pump. Their heat capacity is low; hence circulation must be relatively rapid as compared with water when operating at high temperatures. They allow engines to become overheated. They are completely immiscible with water, and at low temperatures any water in the system is free to freeze and prevent circulation notwithstanding the presence of the oil. The lighter mineral oil fractions, kerosene for example, besides the foregoing objectionable features, present fire hazards and create offensive odors.

With the purpose of overcoming the corrosiveness of water it has been proposed to combine with it a small quantity of oil so that a protective film of oil might be formed on the walls of the cooling systems. In all such instances, however, the percentage of oil has been very small. Quantities of oil greater than the minimum necessary to form a film have been avoided apparently because of a belief that the oil would interfere with the heat transfer characteristics of the water. The object of such proposals has not been accomplished satisfactorily because it has been impossible to secure the deposit of a complete protective film of oil from the mixture and to retain such deposit in effective condition. If the small proportion of oil is thoroughly emulsified a complete protective film does not form. If only partially emulsified, a film forms temporarily but is of only short duration; it cannot satisfactorily withstand the influence of the heat from the source of generation and the continual wiping effect of the flowing liquid. In either instance corrosion continues unabated.

An object of my invention is to improve aqueous heat transfer liquids so that the transfer of heat is increased with increasing demands of the system in which the liquid is employed, and to provide improved methods of cooling internal combustion engines according to which such liquids are circulated in the cooling systems thereof.

Another object of the invention is to provide improved heat transfer media which exhibit superior qualities as compared with the liquids heretofore used for systems operating at relatively high temperatures and which are also adaptable for use at temperatures below the freezing point of water.

A further object of my invention is to provide improved aqueous liquids having superior heat transfer characteristics and possessing the property of permanently protecting the metallic and non-metallic parts of the system in which the liquid flows, against corrosion.

I have found that homogeneous mixtures of water and other normally immiscible liquid components having a greater heat conductivity and higher boiling point than water may be prepared so that these mixtures possess greater advantages than the sum of the advantages of the individual components.

An important feature of my invention consists in the provision of aqueous heat transfer liquids, including liquids usuable at low sub-freezing temperatures, which may be used in conducting heat from a source of generation to a point of liberation and which operate to transfer a greater quantity of heat than water while at the same time protecting the walls of the system against corrosion and other deleterious effects. Insofar as water possesses advantages for heat transfer purposes, these advantages are utilized by the practice of my invention. Insofar as water is disadvantageous due to its relatively low conductivity, its tendency to vaporize at temperatures below the boiling point thereof and its corrosiveness, my invention enables these disadvantages to be avoided.

In carrying out my invention, I form a homogeneous mixture or emulsion of water and a relatively large proportion, less than 40% by volume, of an additional, normally immiscible, liquid component having a greater heat conductivity than water, a higher boiling point and being free of the corrosive influence of water. As the second component of the mixture or emulsion, I preferably use an oil possessing a proper viscosity for emulsion with water. In its broader aspects, my invention contemplates the use of any oil for this purpose, but when animal and vegetable oils are employed they should be of the stable, difficultly oxidizable varieties. I preferably use mineral oils because of their resistance to decomposition under the influence of heat.

The mixture or emulsion of the water and the second component, in cases utilizing oils as such component, is usually effected by the inclusion of an emulsifying agent which acts to keep the water and oil in a homogeneous suspension. Any agent which possesses the quality of emulsifying the second component and the water may be used, for example, fatty acid soaps, sulfated fatty acids and sulfated fatty alcohols are suitable. As a specific agent, I find that triethanolamine oleate produces good results.

The aqueous heat transfer liquids within the scope of my invention may include varying amounts of the second component, but in all instances the amounts should be sufficient to form a homogeneous suspension and to exhibit properties of such component. Generally, from about seven (7%) per cent. to not over forty (40%) per cent. by volume of the second component is a suitable proportion, and I preferably use from about ten (10%) per cent. to about twenty (20%) per cent. thereof.

As a specific illustrative example, a mixture consisting of about seventeen (17%) per cent. by volume of a relatively high flash point mineral oil of the lubricating type, about three (3%) per cent. of triethanolamine oleate and the balance water exhibits the improved qualities common to the heat transfer liquids of my invention. The oil used in this specific example has a flash point of 355° F. according to the open cup test, a pour test of −20° F. and a viscosity of 200 Saybolt at 100° F. Another suitable oil is one which has a viscosity of 44 Saybolt at 100° F. and a flash point well above 300° F. and which, like the oil above mentioned, is readily available on the market. When oil is used as the second component, its flash point should be greater than 275° F., and preferably above 300° F.

In preparing a mixture such as that just described, a suitable procedure involves the formation and combination of two solutions. A measured amount of triethanolamine, for example, is dissolved in the water to form one solution. A measured amount of oleic acid is dissolved in the mineral oil to form the second solution and, while stirring the first solution, the second is poured into the first and the desired suspension obtained. The procedure thus followed may be altered in any suitable way to form a suspension of the oil in the water, and the procedure herein mentioned is suggested only by way of example. Additional liquid constituents may be included, particularly liquids which impart additional anti-freeze qualities to the product.

The mixtures or emulsions produced according to my invention exhibit particular advantages when used as cooling fluids for automobiles, and the like. In connection with Diesel engines, it has been the custom heretofore to use water as the heat transfer medium. Diesel engines operate at higher temperatures than the internal combustion engines in automobiles, and it has been found necessary closely to control the temperature of the water. If cold water is introduced to the engine, harmful chilling of the metal parts and other serious results are noted. Accordingly, the water is maintained within a range of temperatures between 120° F. and 180° F. If allowed to exceed 180° F., vaporization of the water seriously impairs the transfer of heat. It is necessary, therefore, to maintain rapid flow of the water and to cool the outgoing water to a temperature of approximately 120° but not more before reintroducing it to carry away further heat from the engine.

By the use of the compositions of my invention more efficient transfer of heat from a Diesel engine may be obtained, and precautions followed in connection with water are rendered unnecessary. These compositions do not exhibit a tendency to vaporize until the boiling point of water has been reached. They remain in intimate conducting contact with the surfaces of the system; hence there is no need to avoid temperatures in excess of 180° F. Furthermore, at lower temperatures up to about 150° F. they exhibit heat transfer characteristics substantially identical with those of water. As the temperature of the compositions increases, however, the efficiency of heat transfer also increases, and a given amount of these compositions, flowed at the same rate as water, provides a noticeably improved cooling of the engine.

This phenomenon observed in using my compositions suggests that they possess a reserve capacity for heat transfer. I am not aware of the precise explanation of this phenomenon, but it may be due to the existence of two interrelated phases in the liquid, a water phase which provides a high capacity for heat absorption, and a more highly conductive phase which renders heat transfer to and from the water more efficient at higher operating temperatures.

It appears that by virtue of the presence of the more highly conductive component heat is transferred more quickly into the body of the flowing liquid and therefore a given quantity of the liquid takes up and yields larger amounts of heat for a given rate of flow. Thus, instead of utilizing merely the volume of liquid which contacts or closely approaches the surfaces at the heat source and the cooling surfaces at the point of liberation, it appears that a much greater proportion of the flowing stream is utilized for heat transfer.

The superior heat conductivity of my improved liquids is clearly shown by the drawing appended hereto and forming a part hereof, in which the curves 1 and 2 represent, respectively, the results of identical and coextensive heat conductivity tests on water and a liquid corresponding to the illustrative example hereinabove described. Equal volumes of water and the liquid were subjected to the same heating influence. Beginning at an atmospheric temperature of 79° F., they were heated to temperatures of 185° F. and 212° F., respectively, the progressive rise in temperatures being recorded by similarly placed thermometers. During the first part of the heating period the temperatures of the two fluids increased together to the point $a$ on the curves, which represents a temperature of about 129° F. Thereafter the thermometer in the improved liquid stepped ahead of the one in the water, gradually until temperatures between 150° F. and 160° F. had been reached, and then more rapidly. The curve 1 representing the water temperature flattened out from about the point $b$ to the end of the test, while, as indicated at $c$ on the curve 2, the rate of conductivity by the improved liquid continued as at low temperatures. After fifty minutes the thermometer in the liquid had reached 212° F., while the other thermometer recorded a temperature of 185° F.

The effect of this comparative conductivity test is to show that while water and my improved heat transfer liquid have substantially the same degree of conductivity at lower temperatures, as the temperature rises above 120° F. the improved liquid conducts heat away from a heat source more rapidly. In reaching a temperature of 185° F. the water lagged 12 minutes behind the improved liquid.

In connection with the cooling systems of automobiles, I find that my improved heat transfer liquids produce results considerably better than heretofore attained. When used in automobiles, the temperature of the engine quickly assumes a normal operating range beyond which no higher temperatures are reached regardless of the operating conditions. It appears that, as the engine liberates more heat due to extraordinary conditions or high speed operation, the improved liquids herein described pick up and deliver the excess of heat to the radiator of the automobile without allowing the engine temperature to increase.

An extremely important feature of the improved heat transfer liquids including substantial portions of oil consists in their inhibition of corrosion. After long periods of use thereof the metallic parts of a cooling system remain bright and clean, and there is no evidence of corrosion. The non-metallic parts are undamaged. The resistance to corrosion of these liquids is indicated by tests in which connected strips of copper, aluminum, solder and steel have been kept immersed in the liquid within the cooling system of an automobile for a long period of time. After such tests, the strips of metal exhibited no corrosion and no electrolytic action but were as clean and bright as when inserted.

As a further embodiment of my invention, I mix with the water and the second normally immiscible component an additional agent or agents adapted to lower the freezing point of the mixture and to enable its use during winter as a cooling fluid for automobiles and like mechanisms subjected to low temperatures and harsh weather conditions. Thus I have found that an emulsion of water, oil, and a polyhydric alcohol, for example, ethylene glycol, diethylene glycol, or glycerine, possesses a resistance to freezing far greater than mixtures including water and the same amount of the anti-freeze constituent, and at the same time avoids all corrosion of the cooling system and improves the heat transfer therein. A specific illustrative example of such an emulsion includes, by volume, about seventeen (17%) per cent. of a mineral oil having a flash point of 355° F., open cup, and a viscosity of 200 Saybolt at 100° F., about twenty-three (23%) per cent. of glycerine, about two (2%) per cent. of an emulsifying soap, such as triethanolamine oleate, and the balance water. The content of oil in these low freezing emulsions may be varied as in the case of the liquids described above for high temperature operations. The polyhydric alcohol content may be varied as desired, depending upon the desired freezing point of the resulting composition.

A notable property of these low temperature liquids relates to their unexpected anti-freeze characteristics. A composition consisting of water and twenty (20%) per cent. of glycerine, for example, forms a crystalline mush at 21° F., while forty (40%) per cent. of glycerine is required to avoid freezing of water at 0° F. The above example of my invention, including about twenty-three (23%) per cent. of glycerine, has a markedly lower point of solidification. At 5° F. it is as fluid as at room temperatures; at −4° F. it pours easily; at −15° F. it becomes somewhat plastic and possesses physical characteristics comparable to relatively limpid cold cream. Not until this mixture reaches a temperature of about −21° F. is it too stiff to be pumped, yet even at such low temperatures there is no perceptible crystal formation but, rather, the composition becomes heavy and butterlike.

The low temperature compositions above described, when used, for example, as cooling liquids for automobiles, have what may be described as a thermostatic effect on the temperature of the engine. At extremely low temperatures, for example below 0° F., other aqueous compositions like water-alcohol or water-glycerine mixtures, if sufficiently concentrated to avoid freezing, have a definite chilling effect on the engine when it is first started. My low temperature compositions, however, because of their plastic characteristics at sub-zero temperatures, do not flow with sufficient rapidity to chill the engine, and as a result the engine is permitted to assume a satisfactory operating temperature after the first explosions within the combustion chambers. As the heat output of the engine increases, my composition quickly becomes more fluid, and consequently the amount of heat taken up and transferred by it increases accordingly. These low temperature compositions possess all of the characteristics of those previously described for high temperature operations, and they are even preferable because there is no stratification of the components after long periods of quiescence.

It is evident, therefore, that I have provided aqueous heat transfer liquids which are suitable for year-around use in automobiles, regardless of weather conditions and temperatures, and that these compositions not only are preferable to water and aqueous mixtures heretofore used for operations within special temperature ranges, but they also overcome the corrosiveness and other harmful qualities of these prior art liquids.

While I have described specific examples of my invention and specific ranges of percentages for the components of my heat transfer liquids, it is apparent that the scope of my invention is not limited thereto, but that I am entitled to broad protection within the spirit of the specification and the scope of the appended claims.

I claim:

1. The method of cooling an internal combustion engine which comprises circulating in the cooling system thereof an aqueous heat transfer liquid comprising a predominant amount of water and from 7 to 40 per cent. of a relatively high flash point mineral oil emulsified therewith.

2. The method of cooling an internal combustion engine which comprises circulating in the cooling system thereof an aqueous heat transfer liquid comprising from about 7 to about 40 per cent of a difficultly oxidizable oil dispersed throughout more than 50 per cent. of water and an emulsifying agent in an amount sufficient to stabilize the dispersion.

3. The method of cooling an internal combustion engine which comprises circulating in the cooling system thereof an aqueous heat transfer liquid comprising from about 10 to about 20 per cent. of a mineral oil having a flash point higher than 275° F. dispersed throughout more than 50 per cent. of water and an emulsifying agent in an amount sufficient to stabilize the dispersion.

4. The method of cooling an internal combustion engine which comprises circulating in the system thereof a heat transfer liquid possessing antifreeze qualities and including from about 7 to about 40 per cent. of a difficultly oxidizable oil, more than 50 per cent. of water, a substantial proportion of polyhydric alcohol and an emulsifying agent maintaining the constituents in a homogeneous dispersion.

5. The method of cooling an internal combustion engine which comprises circulating in the cooling system thereof a heat transfer liquid possessing anti-freeze qualities and including from about 7 to about 40 per cent. of mineral oil having a flash point higher than 275° F., more than 50 per cent. of water, a substantial proportion of glycerine and an emulsifying agent maintaining the constituents in a homogeneous dispersion.

6. A heat transfer liquid for circulation in heat exchange systems comprising a stable emulsion including from about 7 to about 40 per cent. of a difficultly oxidizable oil, more than 50 per cent. of water, and a substantial amount of additional liquid resistant to freezing at temperatures below the freezing point of water.

7. A heat transfer liquid for circulation in heat exchange systems comprising from about 7 to about 40 per cent. of a difficultly oxidizable oil, more than 50 per cent. of water, a substantial proportion of polyhydric alcohol rendering the liquid resistant to sub-freezing temperatures and an emulsifying agent maintaining the constituents in a homogeneous dispersion.

8. A heat transfer liquid comprising from about 10 to about 20 per cent. of mineral oil of relatively high flash point, more than 50 per cent. of water, a substantial proportion of polyhydric alcohol rendering the liquid resistant to sub-freezing temperatures and an emulsifying agent maintaining the constituents in a homogeneous dispersion.

9. A heat transfer liquid comprising from about 10 to about 20 per cent. of mineral oil of relatively high flash point, more than 50 per cent. of water, a substantial proportion of glycerine rendering the liquid resistant to sub-freezing temperatures and an emulsifying agent maintaining the constituents in a homogeneous dispersion.

10. A heat transfer liquid comprising approximately 17% of a mineral oil having a flash point in excess of 300° F., about 23% of glycerine, more than 50% of water, and triethanolamine oleate maintaining the constituents in a homogeneous dispersion.

11. A heat transfer liquid for circulation in heat exchange systems, comprising from about 7 to about 40 per cent. of a difficultly oxidizable oil, more than 50 per cent. of water, an emulsifying agent in an amount sufficient to stabilize the dispersion, and a substantial amount of additional liquid resistant to freezing at temperatures below the freezing point of water.

12. A heat exchange liquid for circulation in heat exchange systems, comprising from about 7 to about 40 per cent. of a difficultly oxidizable oil, more than 50 per cent. of water, a substantial proportion of alcohol rendering the liquid resistant to sub-freezing temperatures and an emulsifying agent maintaining the constituents in a homogeneous dispersion.

EZRA J. MORGAN.